Dec. 31, 1968 N. W. HURSH ET AL 3,419,807

CIRCUIT PROTECTION FOR A TELEVISION RECEIVER

Filed May 23, 1966

INVENTORS
NEAL W. HURSH &
JOHN STARK, JR.
BY Eugene M. Whitacre
Attorney 3,419,807

CIRCUIT PROTECTION FOR A TELEVISION RECEIVER

Neal W. Hursh and John Stark, Jr., Indianapolis, Ind., assignors to Radio Corporation of America, a corporation of Delaware Filed May 23, 1966, Ser. No. 552,079
7 Claims. (Cl. 328—8)

ABSTRACT OF THE DISCLOSURE

In a television receiver, a circuit breaker is provided which is responsive jointly to total current supplied to the receiver and to current supplied to the horizontal deflection output stage. The circuit breaker includes a bi-metallic breaker contact through which receiver current flows and a heating element operatively associated with the bi-metallic element. The current supplied to the horizontal output tube flows through the heating element.

Figures 1, 2:
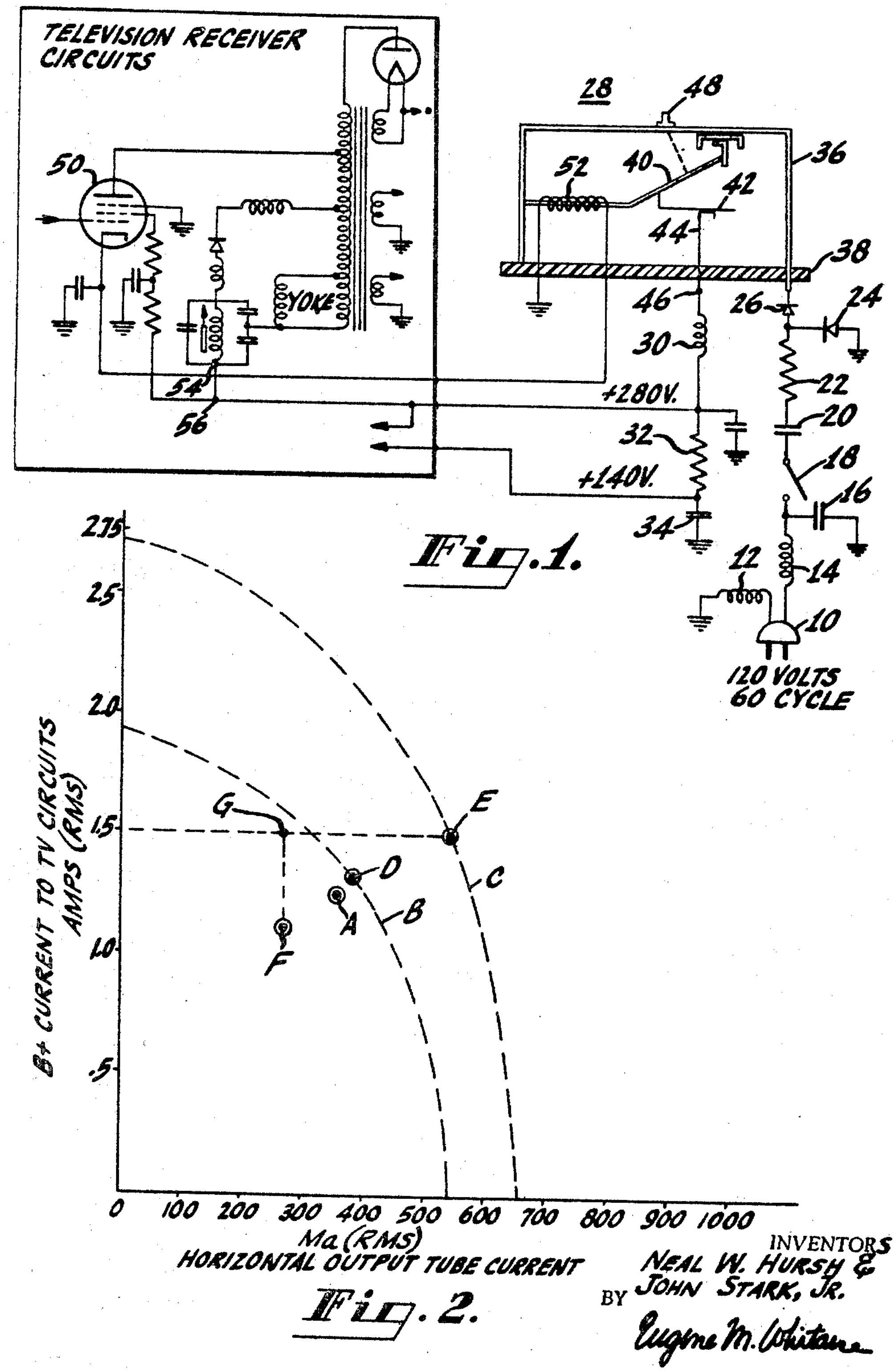

This invention relates to television receivers and more particularly to a protection circuit for the horizontal output stage of a television receiver.

In the operation of a television receiver, if drive to the horizontal output tube is lost, the current through the output tube increases to such an extent that the tube may be destroyed. Some protection of the horizontal output tube may be provided by circuit breakers which are responsive to the total current drawn by the receiver, including that of the horizontal output tube. However, with the expected tolerances of the various circuit components and operating conditions, economically available circuit breakers have not been sufficiently sensitive to increases in the horizontal output tube component of the total receiver current to reliably prevent catostrophic failure of the horizontal output tube.

Therefore, an object of the present invention is to provide an improved protection circuit for the horizontal output tube of a television receiver.

A protection circuit for the horizontal output stage of a television receiver embodying the invention includes a circuit breaker in the power supply for the receiver. The circuit breaker is responsive to the total current drawn by the receiver such that excessive receiver current drain causes the circuit breaker to open and deenergize the receiver. In addition, the circuit breaker is made separately responsive to the horizontal output stage current, which is one component of the total receiver current. The combination of effects of the total receiver current and horizontal output stage current provide a high degree of sensitivity and reliability in the circuit breaker operation, to ensure that the circuit breaker operates to deenergize the receiver when the horizontal output stage current exceeds a prescribed safe level.

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 1 is a schematic circuit diagram of a portion of a television receiver, partly in block form, which includes a horizontal output tube protection circuit embodying the present invention; and FIGURE 2 is a graph showing a locus of points where the circuit breaker will be open or closed as a function of the total set current and the horizontal output tube current.

Referring to FIGURE 1, the power supply for a television receiver includes a plug 10 for connection to the alternating current mains, such as 120 volts A.C. One terminal of the plug 10 is connected through an inductor 12 to ground, while the other terminal of the plug is connected through a series inductor 14 and shunt capacitor 16 to an on-off switch 18. When the switch is closed, alternating current is rectified by a voltage doubler circuit including a series capacitor 20-resistor 22, and a pair of rectifier devices 24 and 26. The rectified current flows from the series diode 26 through a circuit breaker 28 and a choke 30 to those circuits in the receiver requiring 280 volts. A voltage dropping resistor 32 and shunt filter capacitor 34 provide a lower voltage, i.e. 140 volts for other circuits in the receiver.

The circuit breaker 28 includes a conductive frame 36 mounted on an insulating support member 38. A bimetallic element 40 which is mechanically and electrically coupled to the frame 36 supports a first contact 42 of the circuit breaker 28. A fixed contact 44 cooperatively associated with the contact 42 includes a connection 46 which extends through the insulating support panel 38. Thus the connection 46 and the frame 36 form one pair of terminals for the circuit breaker.

The circuit breaker as described to this point may be the same as that used in the CTC–17X television receiver chassis manufactured by Radio Corporation of America.

In operation, the current from the diode 26, which is the total current drawn by the receiver, flows through the frame 36, the bimetallic element 40, the contacts 42 and 44 to the appropriate circuits in the television receiver. The bimetallic element 40 is heated by the current flowing therethrough, and if the current exceeds a predetermined level, sufficient heat is produced to cause the bimetallic element to flex to a second stable position such that the contacts 42 and 44 open, and the low voltage circuit to the receiver is broken. The circuit breaker may be reset by actuating a reset button 48 which is mechanically coupled to the bimetallic element 40 as diagrammatically indicated by the dashed line.

To increase the sensitivity of the circuit breaker to that component of the receiver current drawn by the horizontal output tube 50, a heating element 52 carrying the horizontal output tube 50 current is thermally associated with the bimetallic element 40. As shown in the drawings, the heating element may comprise a coil of heater wire wound around, but insulated from the bimetallic element 40. One terminal of the heating element is connected to ground, and the other terminal passes through the insulating support 38 and is connected to the cathode of the horizontal output tube 50. Thus the total cathode current for the tube 50 flows through the heating element 52. It will be understood that the heater winding 52 may be connected in the anode circuit of the tube 50 by changing the connections so that the cathode of tube 50 is grounded, and connecting the heater wire in series between the terminals 54 and 56.

The graph of FIGURE 2 includes an ordinate indicating total RMS receiver current and an abscissa indicating RMS current through the horizontal output stage. Point A on the graph indicates the maximum normal set current and maximum normal horizontal output tube current for the expected tolerances in components and operating conditions. Curve B is a locus of points to the left of which manufacturing specifications require that the circuit breaker contacts will be closed, and curve C is a locus of points to the right of which specifications require that circuit breaker contacts must be open. The circuit breaker is set to just hold in (point D) with the maximum normal operating current simultaneously flowing through the bimetallic element 40 and the heater element 52. An increase in current in either leg will cause the circuit breaker contacts to open in a given amount of time depending on how much the hold current is exceeded.

The operating point E on curve C represents the minimum receiver currents under conditions where the drive to the horizontal output tube has failed. The normal receiver currents for such a receiver with the horizontal output stage operating normally is shown at point F. The difference between the normal receiver currents as indicated by the points F and A are a result of tolerances of the various components and operating conditions as temperature, line voltage, etc.

With a receiver whose normal operating currents are at point F, and not including the heating element 52, it will be seen that failure of the drive to the horizontal output tube will cause an increase in total receiver current to about 1.5 amperes so that an operating point will be produced at point G. It can be seen that point G is to the left of curve B and hence the circuit breaker contacts will not open even though the horizontal output tube is drawing current beyond its dissipation rating. Many receivers whose normal operating currents fall between points A and F, will have resultant operating points upon failure to drive to the horizontal output stage lie somewhere between the curves B and C, were the circuit breaker may or may not operate.

With the heating element 52 connected as shown in FIGURE 1, when the horizontal output tube draws more current, thus increasing the current through the heating element 52, an equal increase in current flows through the bimetallic element 40, thus increasing the sensitivity of the unit to drive failures to the horizontal output tube 50.

What is claimed is:

1. A protection circuit for a television receiver comprising in combination:

a power supply for providing operating current for said television receiver;

circuit breaker means comprising a first conductive element connected in series between said power supply and said receiver to provide a first current path for supplying said operating current to said receiver;

a horizontal output stage arranged to utilize a portion of said operating current having a direct current path for said portion;

said circuit breaker means further comprising a second conductive element operatively associated with said first element connected in said direct current path of said horizontal output stage, said circuit breaker means being jointly responsive to said operating current and said portion thereof for opening said first current path when either said operating current or said portion thereof exceeds predetermined limits.

2. A protection circuit as defined in claim 1 wherein said circuit breaker means further comprises a pair of contacts associated with said first conductive element, said first element including a heat responsive member coupled to one of said contacts to cause said contacts to close or to open depending on the temperature of said heat responsive member.

3. A protection circuit for a television receiver comprising in combination:

a power supply for providing operating current for said television receiver;

a circuit breaker comprising a first conductive element connected in series between said power supply and said receiver to provide a first current path for supplying said operating current to said receiver, said circuit breaker further comprising a pair of contacts associated with said first conductive element, said first element including a heat responsive member coupled to one of said contacts to cause said contacts to close or to open depending on the temperature of said heat responsive member, a horizontal output stage arranged to utilize a portion of said operating current having a direct current path for said portion;

said circuit breaker further comprising a second conductive element operatively associated with said first element, connected in said direct current path of said horizontal output stage and including a heating element electrically insulated from but thermally coupled to said heat responsive member, said circuit breaker being jointly responsive to said operating current and said portion thereof to open said first current path when either said operating current or said portion thereof exceeds predetermined limits.

4. A protection circuit as defined in claim 3 wherein said heat responsive member comprises a bimetallic member.

5. A protection circuit as defined in claim 4 wherein said heating element comprises a heating coil wound on said bimetallic member.

6. A protection circuit as defined in claim 5 wherein said horizontal output stage comprises an electron tube including an anode and a cathode, and said heating element is connected in series with the anode-to-cathode current path of said electron tube.

7. A protection circuit for television receivers comprising electrical current supply means connected to supply electrical current to said television receiver;

circuit breaker means including a pair of contacts connected in series with said electrical current supply means and a thermally responsive element for actuating said contacts, said circuit breaker means further including a first current sampling circuit electrically and thermally coupled to said element and a second circuit electrically isolated from said first current sampling circuit but thermally coupled to said element, said circuit breaker means being jointly responsive to the current in said first and second circuits to open said contacts when the current drawn by said receiver from said electrical current supply means exceeds a predetermined level;

means connecting said first current sampling circuit to said electrical current supply means for sensing and responding to the current level of said electrical current supply means; and means connecting said second current sampling circuit for sensing the current level through a particular component of said television receiver.

References Cited

UNITED STATES PATENTS

| | | | |
|---|---|---|---|
| 1,634,979 | 7/1927 | Carter | 317—51 |
| 2,441,979 | 5/1948 | Schmidinger et al. | 328—11 |

JOHN W. HUCKERT, *Primary Examiner.*

J. D. CRAIG, *Assistant Examiner.*

U.S. Cl. X.R.

328—11, 259; 315—100; 317—40